(12) United States Patent
Wuerth et al.

(10) Patent No.: US 8,770,673 B2
(45) Date of Patent: Jul. 8, 2014

(54) BRAKE DEVICE FOR A MOTOR VEHICLE HAVING A PRESSURE ACCUMULATOR

(75) Inventors: Gebhard Wuerth, Sulzbach-Laufen (DE); Volker Mehl, Weingarten (DE); Michael Kunz, Steinhein An Der Murr (DE); Matthias Leiblein, Gerlingen (DE); Werner Quirant, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 667 days.

(21) Appl. No.: 12/737,091

(22) PCT Filed: Apr. 21, 2009

(86) PCT No.: PCT/EP2009/054700
§ 371 (c)(1),
(2), (4) Date: Mar. 24, 2011

(87) PCT Pub. No.: WO2009/149981
PCT Pub. Date: Dec. 17, 2009

(65) Prior Publication Data
US 2011/0175435 A1    Jul. 21, 2011

(30) Foreign Application Priority Data
Jun. 11, 2008   (DE) .................. 10 2008 002 348

(51) Int. Cl.
*B60T 13/74*    (2006.01)

(52) U.S. Cl.
USPC ...................................... 303/3; 303/DIG. 11

(58) Field of Classification Search
USPC .................. 303/3, 115.1, 115.2, 116.1, 116.2, 303/122.12, 122.13, DIG. 1, DIG. 2, DIG. 4, 303/DIG. 11; 701/70, 71, 78, 79, 82, 83
See application file for complete search history.

(56) References Cited

U.S. PATENT DOCUMENTS

| | | | | |
|---|---|---|---|---|
| 5,484,194 A | * | 1/1996 | Reinartz et al. | 303/116.2 |
| 5,584,539 A | * | 12/1996 | Hashida | 303/113.2 |
| 6,082,830 A | * | 7/2000 | Volz et al. | 303/113.4 |
| 6,318,817 B1 | * | 11/2001 | Martin et al. | 303/116.1 |
| 6,499,812 B1 | | 12/2002 | Gronau et al. | |
| 8,271,172 B2 | * | 9/2012 | Heller et al. | 701/70 |
| 2002/0153767 A1 | * | 10/2002 | Pasterkamp et al. | 303/114.1 |
| 2009/0072616 A1 | | 3/2009 | Weh et al. | |
| 2009/0210127 A1 | | 8/2009 | Crepin et al. | |

FOREIGN PATENT DOCUMENTS

| | | |
|---|---|---|
| CN | 101010229 | 8/2007 |
| DE | 10 2006 020 890 | 11/1977 |
| DE | 33 13 078 | 10/1984 |
| DE | 41 28 087 | 2/1993 |
| DE | 42 32 311 | 2/1994 |
| DE | 44 34 960 | 4/1996 |
| DE | 44 45 360 | 6/1996 |
| DE | 195 37 926 | 4/1997 |
| DE | 198 42 872 | 1/2000 |
| DE | 103 19 194 | 9/2004 |
| DE | 103 16 090 | 10/2004 |

(Continued)

*Primary Examiner* — Pamela Rodriguez
(74) *Attorney, Agent, or Firm* — Kenyon & Kenyon LLP

(57) ABSTRACT

In a brake device for a motor vehicle having a first and a second hydraulic brake circuit, the second brake circuit is decoupled from the main brake cylinder in partial braking operations, and is operated with the aid of a pressure accumulator controlled by a control device, which takes an additional deceleration effect due to an active power component, e.g., a generator, into account.

17 Claims, 3 Drawing Sheets

(56) References Cited

FOREIGN PATENT DOCUMENTS

| | | |
|---|---|---|
| DE | 10 2005 046 606 | 4/2007 |
| DE | 10 2006 020 520 | 11/2007 |
| EP | 0 173 954 | 3/1986 |
| JP | 8-230640 | 9/1996 |
| JP | 9-2231 | 1/1997 |
| JP | 10-500083 | 1/1998 |
| JP | 10-81218 | 3/1998 |
| JP | 10-506345 | 6/1998 |
| JP | 2005119427 | 5/2005 |

\* cited by examiner

BRAKE DEVICE FOR A MOTOR VEHICLE HAVING A PRESSURE ACCUMULATOR

BACKGROUND OF THE INVENTION

1. Field of the Invention

The present invention relates to multi-circuit brake systems for motor vehicles.

2. Description of Related Art

Such multi-circuit brake systems, particularly of the hydraulic type, have gained ground in the vehicle manufacture for reasons of efficiency and reliability through redundancy. In response to the actuation of the brake pedal, hydraulic fluid in a main brake cylinder is typically compressed and displaced to the hydraulic brake circuits.

Modified constellations may result, for example, in that additional deceleration means such as connected generators in the form of the vehicle's electric generator or an electric drive motor operated as generator are integrated in the brake system in hybrid vehicles. This allows for recuperative braking, for example, which, for one, does not stress the brake and for another, recovers energy from the kinetic energy of the vehicle during braking. However, when combining the deceleration effects by corresponding active power components on the one hand and the wheel brakes on the other, considerable problems must be solved. The deceleration effect of regenerative active power components may be variable, in particular, so that the driver must compensate for corresponding changes in the rate of deceleration by stronger or weaker actuation of the brake pedal.

Control devices for controlling or regulating elements of a braking system are basically known in a wide variety of types. They are used, for instance, in ABS systems, in traction control systems, in the dynamic electronic stabilization of a vehicle during cornering, or also as aid in unbraked cornering by automatic application of the brakes at a wheel on the inside of the curve.

From German patent application document DE 102006020890, a brake device having a particularly compact design of a hydraulic block is known.

From German patent application document DE 102006020520, a brake system having a brake-limiting, correspondingly controlled valve is known.

From published German patent application document DE 4128087 A1, a brake pressure regulating system for a vehicle is known, by which an underbraked rear axle is prevented when braking during cornering. The brake pressure at the front axle is specified by the driver, and the brake pressure at the rear axle is regulated as a function thereof.

It is basically also known to distribute the brake force such that, if possible, heavy braking of the vehicle is achieved while taking the adhesion utilization into account; in this context, it also is possible for wheels that are statically and/or dynamically more heavily loaded to be braked to a correspondingly greater degree.

From published European patent document EP 0173954 B1, a system is known in which the brake pressures for individual brakes are ascertained in a stored vehicle-specific characteristics map with the aid of a reference mass for the vehicle and the driver-specified nominal deceleration. The determined brake pressures are applied at the brakes and, if necessary, are adjusted if the vehicle deceleration deviates from the nominal value, until the nominal deceleration has been achieved.

From published German patent application document DE 3313078 A1, a brake pressure regulation device is known, which determines the wear of various wheel brakes and takes it into account, so that even wear of the individual wheel brakes is achieved in the long term.

From German patent application document DE 102005046606, a brake system is known in which an individual brake circuit is assigned to one of the axles of a vehicle, so that a traction control device as well as an electronic stability control device may be provided in one brake circuit exclusively, which minimizes the constructive overall investment.

Finally, from published German patent application document DE 10316090 A1, a brake system is known which has a plurality of brake circuits, which basically act hydraulically and act on friction brakes of individual wheels; furthermore, it has a generator or an electric drive motor which can be operated as generator and be used for deceleration in addition. A control device is provided in order to optimize the brake force distribution to all individual wheels while taking different variables pertaining to driving dynamics into account.

BRIEF SUMMARY OF THE INVENTION

Against the background of the related art, an object of the present invention is providing a brake device for a motor vehicle, which also supports complex control processes related to braking and vehicle dynamics, has the highest reliability possible and a simple constructive design, if possible.

Using the present invention, a conventional hydraulic brake circuit may be realized in the brake circuits of the first group (in conventional motor vehicles, this is often only a single first brake circuit), which has the known simplicity in its configuration and the corresponding reliability and availability. Furthermore, upon actuation of the brakes of the first brake circuit, the driver has an immediate sense of actuation due to the coupling of the brake pedal to the first brake circuit(s) via the main brake cylinder.

In addition, however, at least one second brake circuit of a second group is provided, which is not directly coupled to the brake pedal or the main brake cylinder, at least in partial braking operations, but typically functions as brake-by-wire brake having electronic pick-off at the brake pedal. This design makes it especially simple to blend the deceleration effect of additional active power components that act on the corresponding wheels with the braking effect of a second brake circuit, i.e., to combine them in an additive manner such that a total deceleration effect results over all, which remains as uniform as possible and corresponds to the braking intention of the driver.

In a complete failure of the blending control, the second brake circuits revert to a conventional hydraulic function mode, so that the full braking capability remains intact.

In order to be able to sufficiently decouple the second brake circuits from the brake-actuating device in the form of the accelerator, or from the main brake cylinder, the present invention provides a pressure accumulator for supplying pressure to these brake circuits; this accumulator is able to be connected to the pressure side of the second brake circuits by means of a compensation valve, where it forwards the required brake pressure to the wheel brakes via brake-pressure generation valves under the control of a control device.

The volume of the pressure accumulator may advantageously be set such that a plurality of braking operations is able to be executed without recharging.

The recharging of the pressure accumulator ideally takes place in the unbraked state, with the aid of a hydraulic pump of a second brake circuit.

The compensation valve may be configured either as compensation control valve for adjusting a particular pressure differential or for obtaining a specific absolute pressure, the last variant requiring pressure sensors on the pressure side of the second brake circuit.

In addition to the pressure accumulator and the compensation control valve, the pressure accumulator device advantageously also includes a sensor for determining the filling ratio of the pressure accumulator, thereby making it possible to determine when recharging is required.

In this context, either a travel sensor is provided for the compression travel of a pressure accumulator implemented as expansion bellows or also as piston/cylinder system, or the sensor may be a pressure sensor.

In one advantageous development of the present invention the pressure accumulator is also connected to a separate brake-pressure generation valve of each wheel brake of a vehicle axle; each wheel brake is additionally connected to a debraking valve, which in turn is linked to a low-pressure accumulator, the debraking valves being controllable differential pressure valves.

In particular because the corresponding pressure-generation and debraking valves are implemented as controllable differential pressure valves, the adjustment of a brake pressure at the individual wheel brakes may take the form of modulated braking, for instance, when an ABS or traction-control system is active at a low throughput rate of hydraulic fluid and thus a low capacity utilization of the pressure accumulator.

If a specific absolute hydraulic pressure determined by a control device is to be supplied via the pressure accumulator, then it is useful to provide a pressure sensor in at least one brake circuit of the second group and to connect it to a control device for the compensation valve.

In order to enable especially efficient recharging of the pressure accumulator, in which hydraulic fluid is aspirated from the reservoir of the main brake cylinder, in particular, it is advantageous if the reservoir of the brake pressure generation device is connected to the intake side of a hydraulic pump of a brake circuit of the second group by way of a switchable charge valve. In the unbraked state of the vehicle, the charge valve may be opened simultaneously with the compensation valve in order to allow charging of the pressure accumulator while the hydraulic pump is operating.

In an especially advantageous manner, the brake device according to the present invention is able to be used in conjunction with additional decelerating active power components in the vehicle. For this purpose, it is advantageous that the wheels braked by the brake circuits of the second group are connected to an active power component which is exerting a decelerating effect. As an alternative or in addition, the wheels braked by the brake circuits of the first group also may be connected to a decelerating active power component. The braking effect of the wheels controlled by means of the pressure accumulator, i.e., the rear wheels or the front wheels of the vehicle, for instance, is able to be optimally blended with the decelerating effect of an active power component with the aid of a corresponding control device, without the driver or potential passengers of the vehicle becoming aware of it as a nuisance.

In an especially advantageous manner, the active assembly may be a generator, particularly an electric drive motor of the motor vehicle in the case of a hybrid vehicle, the electric drive motor being operated as generator.

The brake device according to the present invention is basically usable both in conventional vehicles and in hybrid vehicles having a combination of conventional and electric drives.

If the brake circuits of both groups are implemented as hydraulic brake circuits and each is equipped with a hydraulic pump, the hydraulic pumps being kinetically connected to a shared pump drive, then it is advantageous if the hydraulic pumps assigned to the brake circuits of the first group are able to be mechanically decoupled from the pump drive, especially by an overrunning clutch which is controllable via the direction of rotation of the drive shaft of the pump.

As an alternative in the mentioned case, however, it may also advantageously be provided that the hydraulic pumps assigned to the brake circuits of the first group are able to be connected via valves to the particular pressure output on the intake side.

This mechanically or hydraulically decouples the hydraulic pumps of the idle brake circuits and thereby avoids possibly arising pulsations of the pressure that would normally be perceived as annoying by the driver when he activates the brake pedal during a charge operation.

In addition to relating to a brake device, the present invention also relates to a method for operating such a brake device. It may be provided that the charge valve is open, the compensation valve is open, and the brake-pressure generation valves are closed, and the hydraulic pump of the second brake circuit is operated for the purpose of charging the pressure accumulator.

This enables optimized charging of the pressure accumulator.

In addition, a method for operating a brake device may be provided, in which in partial braking the compensation valve is at least partially open and the pressure in the brake circuit(s) of the second group is controlled or regulated in this way.

This defines the function of the second brake circuits for the most frequently encountered case of partial braking. The brake circuits of the second group are normally decoupled from the main brake cylinder during partial braking, and the corresponding isolating valve is closed.

If the pressure accumulator is not sufficiently charged and full or emergency braking takes place, the corresponding isolation valve may be opened and the brake-actuating device or a main brake cylinder is coupled directly to the pressure side of one or more second brake circuit(s). Although this may prolong the travel of the brake pedal, it does so only to a negligible extent, and the driver perceives the entire selective braking effect of all hydraulic brake circuits through his brake feel.

Toward this end, the pressure accumulator is monitored in the framework of an operating method, and in the event of a full brake application when the pressure accumulator is not sufficiently charged, the isolating valve will be opened and the hydraulic fluid is transported from the brake-pressure generation device into the brake circuit(s) of the second group.

DETAILED DESCRIPTION OF THE INVENTION

Figure 1:
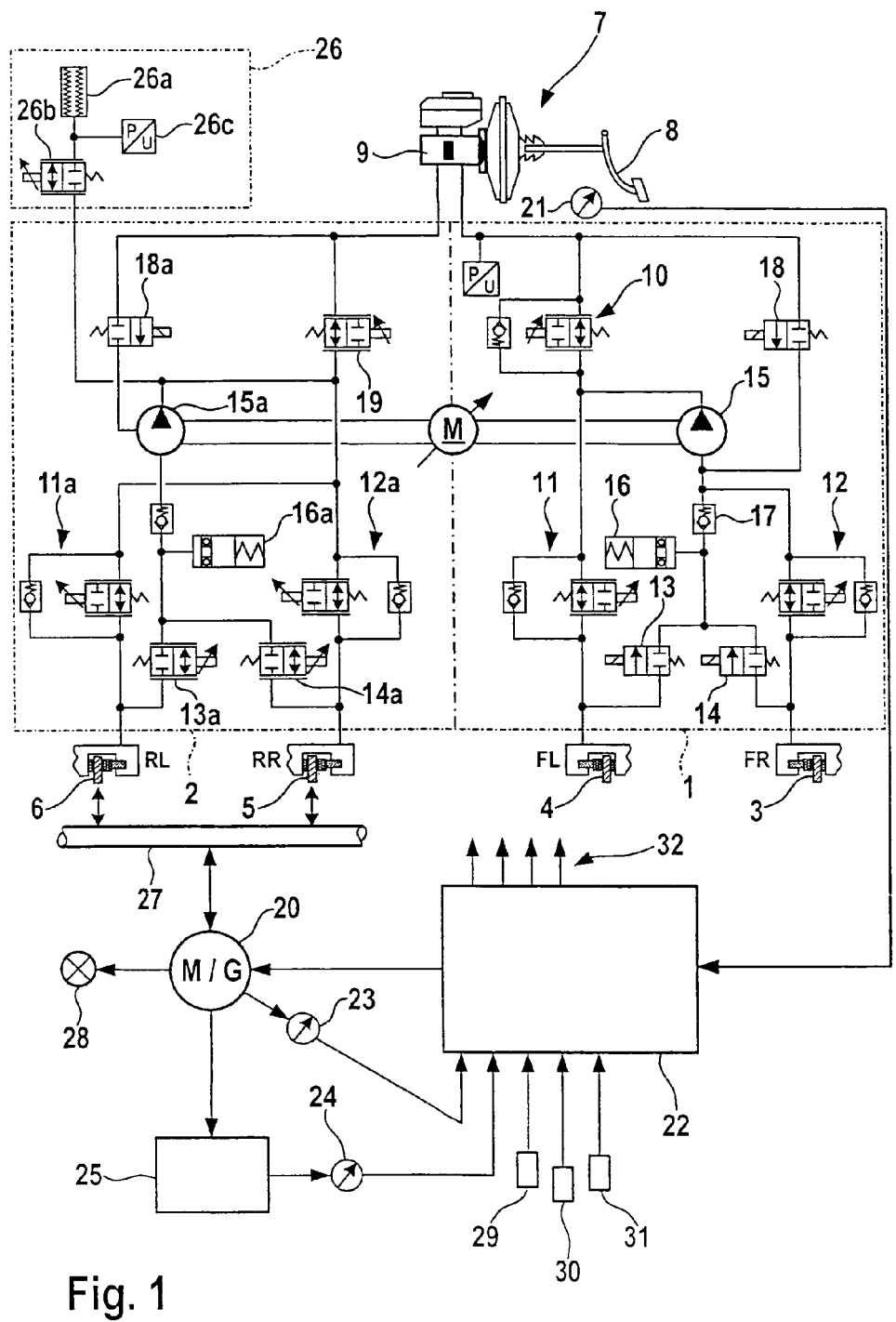
FIG. 1 shows the schematic structure of a brake device according to the present invention, including a control device, which also takes additional decelerating active components into account

FIG. 1 shows a two-circuit brake system, which has a first brake circuit 1 on the right side of the figure, which represents the first group of brake circuits, and a second brake circuit 2, which forms the single brake circuit of the second group of brake circuits in the illustrated exemplary embodiment. However, the dash-dot lines denote merely functional boundaries and assignments; the corresponding units may be combined into common units nevertheless, e.g., into a hydraulic block.

In the following text, the function of first brake circuit 1 will be described to begin with, whereupon the special features of second brake circuit 2 will be addressed.

FIG. 1 shows a brake device having a first brake circuit 1 on the right side, which is assigned to front wheels 3, 4 of a two-axle motor vehicle, as well as a second brake circuit 2, which is assigned to rear wheels 5, 6 of the motor vehicle. The brake circuits are indicated by dash-dot lines in each case. In the specific case in which the motor vehicle has only two brake circuits, first brake circuit 1 forms the first group of brake circuits, which are directly actuable hydraulically, while the second brake circuit forms the second group of brake circuits, which are connected to a hydraulic brake actuation device 7 only in an exceptional case, but are hydraulically decoupled therefrom during partial braking.

As an alternative to the illustrated variant, it is also possible for the brake circuit(s) of the second group to be assigned to the front axle and those of the first group to the rear axle.

Hydraulic brake-pressure generation device 7 has a brake pedal 8 as well as a main brake cylinder 9, in which hydraulic pressure for actuating the brake device is generated in response to the depression of brake pedal 8, possibly using a brake force amplifier.

To begin with, the basic function of such a module is to be explained by way of example with the aid of first brake circuit 1.

If brake pedal 8 is actuated, increased brake pressure is applied in main brake cylinder 9. Via the so-called selector valve 10, whose further function is going to be explained in the following text, it is forwarded to pressure-generation valves 11, 12 assigned to individual wheels 3, 4.

Pressure-generation valves 11, 12 generally forward the increased hydraulic pressure to the brake cylinders of wheels 3, 4, so that the corresponding friction brakes, e.g., in the form of disk brakes, are actuated. The pressure-generation-valves are controllable; during regular partial braking operations, they are also used for debraking purposes in that they allow hydraulic fluid to pass selectively in both directions, as the case may be. In the wheel-specific debraking of an individual wheel in the event that an anti-lock braking system is responding, for instance, pressure-lowering valves 13, 14 are employed as well, so that the hydraulic pressure in the wheel brake cylinders is lowered regardless of the pressure in the high-pressure component of the corresponding brake circuit, and the hydraulic fluid is able to be discharged to the intake side of hydraulic pump 15. There, a hydraulic reservoir 16 is provided for storing the hydraulic fluid. A spring-loaded non-return valve 17 ensures that the hydraulic pump aspirates hydraulic fluid via open aspiration valve 18, if required, and that no hydraulic fluid is able to flow to volume reservoir 16 from the direction of the intake side of the hydraulic pump.

Normally, an anti-lock braking system, which prevents locking of the wheels during excessive braking, is provided for the individual wheels. For this purpose, rpm sensors (not shown), for example, are provided at wheels 4, 3, which emit a signal to a control device 22 when a wheel is locking. In response, brake-pressure generation valve 11, 12 assigned to the wheel is closed, and at the same time the associated brake-pressure lowering valve 13, 14 is opened in order to lift the wheel lock. Simultaneously, hydraulic pump 15 is driven in order to pump highly pressurized hydraulic fluid to the primary side of the brake circuit, so that it is available for further control cycles.

If the corresponding wheel is rotating again, the pressure and thus the braking effect can be increased again by opening brake-pressure generation valve 11, 12 until another locking event appears imminent once more. This iterative process requires hydraulic fluid under high pressure on the primary side of the brake circuit, which is supplied by the brake-actuation device. Hydraulic reservoir 16 ensures the availability of a compensation volume for the hydraulic fluid, particularly when debraking individual wheels via valves 13, 14. The hydraulic fluid is returned to the main brake cylinder by hydraulic pump 15.

The described process may be performed in similar manner also when slip occurs at one wheel or at several wheels when the vehicle begins to drive, or when a wheel brake is actuated for a vehicle dynamics control without brake pressure being available in the main brake cylinder. For this purpose, the pump is switched on and selector valve 10 is closed or controlled according to the desired pressure.

At the same time, the so-called aspiration valve/charge valve 18 is opened, so that hydraulic fluid is able to flow from the region of the reservoir of the main brake cylinder to the intake side of hydraulic pump 15. In all other cases, aspiration valve 18 is advantageously closed.

The function of second brake circuit 2 on the left side of function 1 in many respects is similar to the function of first brake circuit 1; however, there are differences that should be noted, such as the fact that second brake circuit 2 is able to be completely decoupled from two-chamber main brake cylinder 9 by isolation valve 19, particularly during partial braking; furthermore, in contrast to the first brake circuit, the debraking in second brake circuit 2 may also take place exclusively via pressure-lowering valves. In the description of the method of functioning of the second brake circuit, three basic states must be distinguished:

1. When the vehicle is running without deceleration, neither a wheel brake 5, 6 is actuated nor necessarily an active assembly 20 utilized, e.g., in the form of an electric drive motor operated as generator. This has no effect on an operation of corresponding active assemblies, if the particular situation requires it.

2. In case of partial braking, recuperative braking preferably takes place, that is to say, a known brake torque by active assembly 20 is acting on wheels 5, 6. The deceleration wish that the driver made known by operating brake pedal 8 may be recorded by a sensor 21 and forwarded to control device 22. The deceleration torque of active assembly 20 is known to control device 22, or it is measured with the aid of a power sensor 23 and transmitted. As an alternative or in addition, it is also possible to record the charge state of a battery 25, which may be charged by the active assembly if necessary, by a charge sensor 24 and to forward it to control device 22 in order to determine the charge state of active assembly 20.

Making allowance for the brake wish, the deceleration effect actually achieved by first brake circuit 1 through hydraulic means, and the known deceleration torque of active assembly 20, control device 22 calculates the brake deceleration to be achieved by the second brake circuit and adjusts it, primarily by controlling compensation valve 26b, which is operating as pressure-differential control valve, for instance. Pressure accumulator 26a is normally filled with pressurized hydraulic fluid, which is displaced to brake-pressure generation valves 11a, 12a by opening compensation valve 26b. The hydraulic pressure adjusted in this manner is forwarded to wheel-brake cylinders of wheels 5, 6 via brake-pressure generation valves 11a, 12a. Once the maximally possible braking effect has been achieved without causing sliding of the wheels, or for debraking, brake-pressure lowering valves 14a, 13a are opened and hydraulic fluid is able to flow to the intake side of hydraulic pump 15a or back to accumulator 16a.

In a decoupling from the main-brake cylinder, the concept of the pressure accumulator device does not require the brake pressure in the second brake circuit to be generated by a hydraulic pump 15a; instead, available in sufficient quantity and without a delay from the pressure accumulator.

In the unbraked stated of the system, isolation valve 19 is usually open and intake valve/charge valve 18a is closed.

After completing a braking operation, on the other hand, pressure accumulator 26a, which essentially may be made up of metal expansion bellows, a vessel having an elastic diaphragm, an overall elastic vessel or a piston/cylinder system, may be recharged again if this is necessary, by operating hydraulic pump 15a, advantageously when intake valve/charge valve 18a is open and isolation valve 19 is closed. In this state hydraulic fluid is able to be aspirated from the direction of the reservoir of the main brake cylinder chambers. Furthermore, volume accumulator 16a is emptied, and the hydraulic fluid stored there is loaded into pressure accumulator 26a with the aid of pump 15a.

A sensor 26c in the form of a pressure or charge path sensor is available for monitoring the charge state of the pressure accumulator.

In recuperative braking operations of second brake circuit 2, the required braking intensity of the brake circuits of the second group is basically reduced by the additional deceleration action of active assembly 20 on wheels 5, 6 via drive shaft 27, and corresponding energy is recuperated via the active assembly and stored in battery 25, for instance.

In cases in which the deceleration torque of active assembly 20 fluctuates, i.e., when battery 25 is fully charged, for instance, the vehicle slows or the drive train is decoupled from the wheels by a gear-shift operation, keeping the overall deceleration constant requires the control device 22 either to increase the deceleration torque of the active assembly appropriately, if possible, by connecting an electrical consumer 28, for example, and/or to adapt the control of second brake circuit 2 by corresponding control of compensation valve 26b, such that the modified brake force compensates for the changed deceleration torque of active assembly 20.

This is considerably easier to accomplish in the brake device according to the present invention than in conventional brake devices, because the direct actuation of the first brake circuit keeps the braking effect achieved there constant and lets it be controlled quite well by the driver on the one hand, while the compensation of braking effects between the two independent partial-brake devices 2, 20 via control device 22 is able to be realized fairly easily and continuously on the other.

In the case of full braking when the pressure accumulator is not sufficiently charged, isolation valve 19, which remains closed in partial braking operations, is opened, so that the high brake pressure generated in main brake cylinder 9 is able to be forwarded directly to the brake cylinders of wheels 5, 6 via isolation valve 19 and brake-pressure generation valves 11a, 12a. This generates an optimal immediate braking effect, including a corresponding brake feel at brake pedal 8. The coupling of a second brake circuit 2 to brake-pressure generation device 7 causes a minimal prolongation of the pedal travel, which is tolerable in the case of emergency braking, however.

FIG. 1 also shows sensors 29 (transverse acceleration sensor), 30 (slip sensor), and 31 (rotational speed sensor) in the region of control device 22. Furthermore, a driving-direction sensor may be provided, which helps control device 22 to differentiate between forward and reverse driving, so that the brakes of the rear axle may be loaded more heavily when driving in reverse.

In addition, control device 22 may be connected to rpm sensors at wheels 5, 6, and to a sensor that indicates the actuation of the gear clutch.

Corresponding outputs 32 are connected to the controllable valves of the brake device, e.g., valves 11a, 12a, 26b, as well as to valves 13a, 14a.

Figure 2:
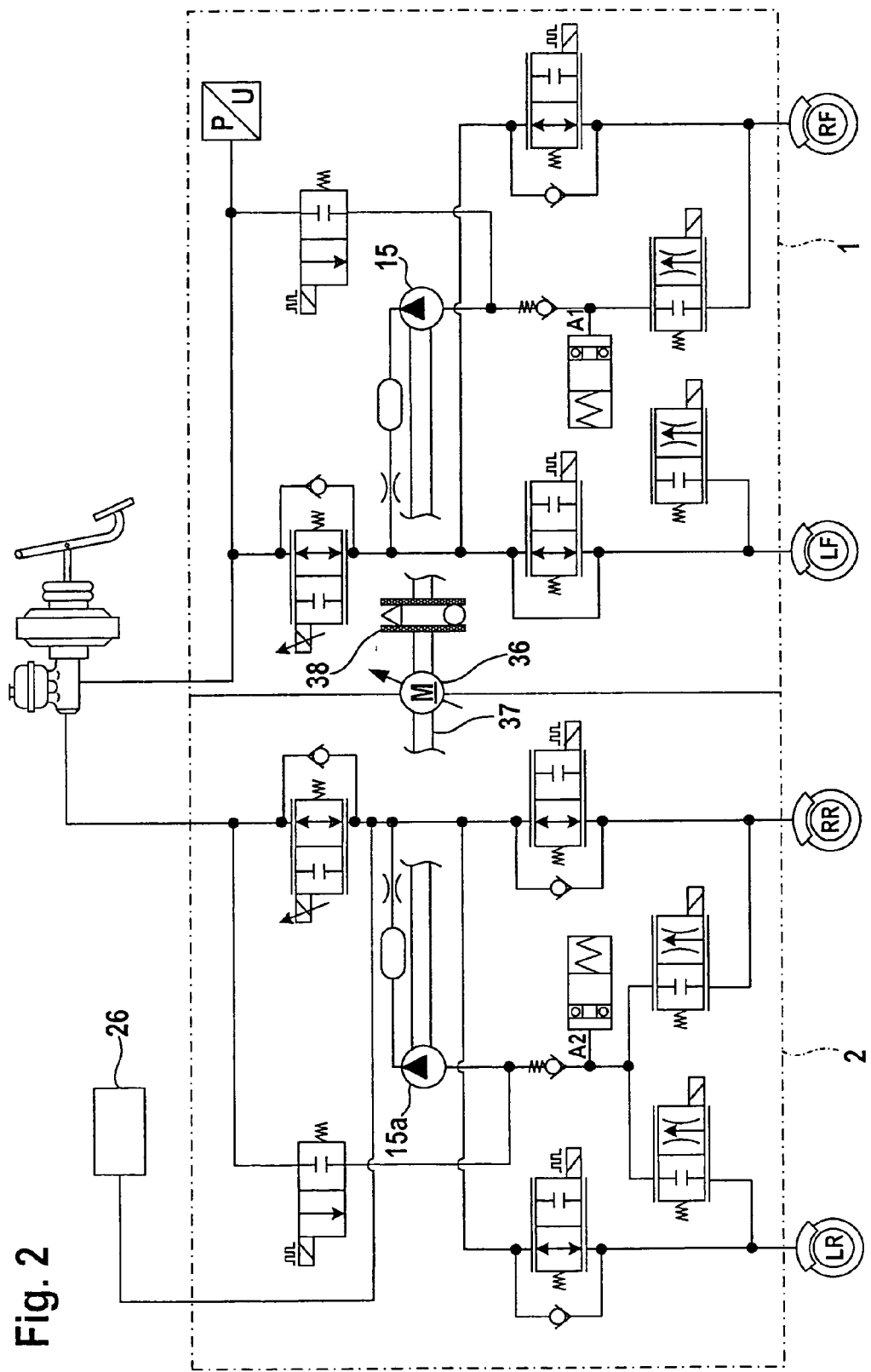
FIG. 2 shows a device for decoupling unneeded hydraulic pumps with the aid of a mechanical free-running clutch.

FIG. 2 shows a brake device, which largely corresponds to the device shown in FIG. 1. Identical elements have therefore been provided with the same reference numerals. FIG. 2 shows a device which increases the comfort by decoupling that particular hydraulic pump 15 that is not required in the corresponding brake circuits from the drive train of pump drive motor 36 when it is not needed. This is accomplished in that pump drive motor 36 is basically able to drive corresponding drive shaft 37 in both directions of rotation, and in that hydraulic pump 15a of the second brake circuit is able to generate hydraulic pressure regardless of the direction of rotation of shaft 37. A mechanical overrunning clutch device 38 is formed on shaft 37 between drive motor 36 and hydraulic pump 15 of the first brake circuit, which ensures that hydraulic pump 15 of the first brake circuit is driven in only one direction of rotation of shaft 37, but not in the opposite running direction.

When the reservoir must be charged while a brake pedal is actuated, this prevents corresponding pulsations from being generated by a pump driven along, so that they will not be noticed by the driver when he is actuating the brake pedal.

Figure 3:
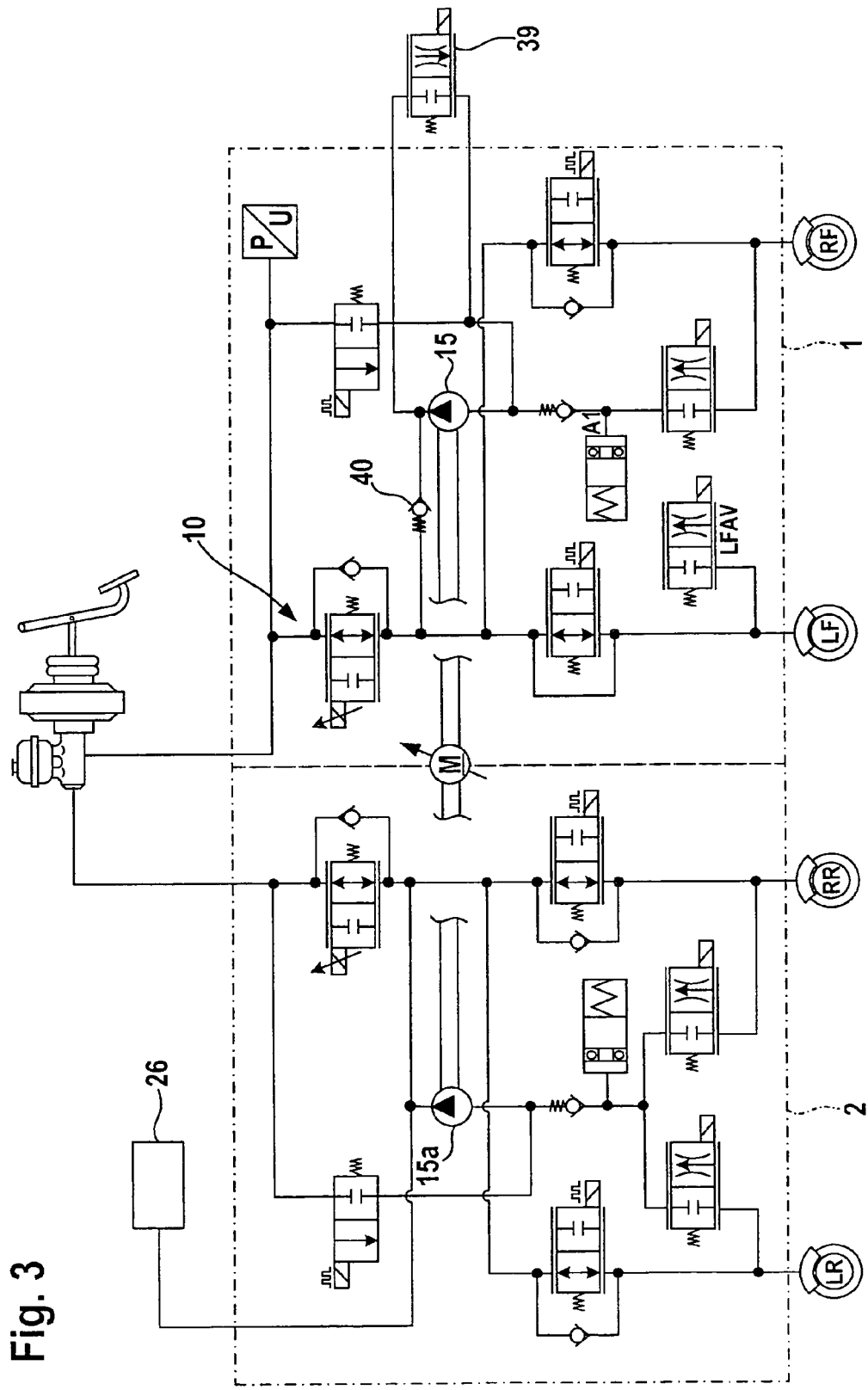
FIG. 3 shows one option for hydraulically decoupling unneeded hydraulic pumps.

In FIG. 3, a brake device is presented which is similar to the brake device shown in FIG. 2; the object of the decoupling of the hydraulic-pressure generation of first brake circuit 1 from the hydraulic pressure generation in second brake circuit 2 is not achieved by a mechanical overrunning clutch of the drive shaft of the hydraulic pumps, but instead in that hydraulic pump 15 of first brake circuit 1 is indeed operated simultaneously with hydraulic pump 15a of second brake circuit 2, but in the decoupling case, the output side of hydraulic pump 15 is connected via a switching valve 39, which is opened in this case, to the intake side of same hydraulic pump 15, so that the pump supplies hydraulic fluid in a circular manner. This ensures idling of hydraulic pump 15, so that pulsations are avoided or at least reduced.

Hydraulic pump 15 is connected to the pressure side of first brake circuit 1 via a spring-loaded non-return valve 40 in order to avoid the debraking via the main brake cylinder into the hydraulic pump.

As a result, the brake device according to the present invention allows a decoupling of individual brake circuits from the main brake cylinder while simultaneously supplying these brake circuits from a pressure reservoir, and it allows the comfortable utilization of recuperative braking operations, in which fluctuations within a subsystem of the brake device are able to be intercepted and compensated and thus are not noticed by the driver or passengers of the vehicle. Furthermore, an additional subsystem of the brake device is provided, which possibly remains unaffected by the compensation processes and is actuated directly in hydraulic manner with the aid of the main brake cylinder. A capable control device suitably controls all occurring brake and deceleration effects.

What is claimed is:

1. A brake device for a motor vehicle, comprising:
   at least one first hydraulic brake circuit of a first brake circuit group;
   at least one second hydraulic brake circuit of a second brake circuit group, wherein a wheel braked by the at least one second hydraulic brake circuit of the second brake circuit group is connected to an active power component exerting a decelerating effect;
   a brake-pressure generation device, wherein the at least one first hydraulic brake circuit is connected to the brake-pressure generation device by a controllable hydraulic valve;
   a hydraulic isolation valve configured to selectively and hydraulically decouple the at least one second hydraulic brake circuit from the brake-pressure generation device; and
   a pressure accumulator connected to the pressure side of the at least one second hydraulic brake circuit by a controllable compensation valve.

2. The brake device as recited in claim 1, wherein the pressure accumulator is provided with a sensor for determining a charge degree.

3. The brake device as recited in claim 2, wherein the sensor is a travel sensor for a compression travel of the pressure accumulator configured as one of an expansion bellows or a piston-and-cylinder system.

4. The brake device as recited in claim 2, wherein the sensor is a pressure sensor.

5. The brake device as recited in claim 1, wherein the pressure accumulator is connected to an individual brake-pressure generation valve of each wheel brake of a vehicle axle, and wherein each wheel brake is connected to an individual de-braking valve, each de-braking valve being connected to a low-pressure accumulator, and wherein each de-braking valve is a controllable differential pressure valve.

6. The brake device as recited in claim 1, wherein a pressure sensor is provided in the at least one second hydraulic brake circuit of the second brake circuit group, and wherein the pressure sensor is connected to a control device for the compensation valve.

7. The brake device as recited in claim 1, wherein a reservoir of the brake-pressure generation device is connected to the intake side of a hydraulic pump of the at least one second hydraulic brake circuit of the second brake circuit group by a switchable charge valve.

8. The brake device as recited in claim 1, wherein the active power component is an electric drive motor operated as a generator.

9. The brake device as recited in claim 1, wherein the at least one first hydraulic brake circuit and the at least one second hydraulic brake circuit each includes a hydraulic pump kinematically connected to a shared pump drive, and wherein the hydraulic pump assigned to the at least one first hydraulic brake circuit is configured to be mechanically decoupled from the shared pump drive by an overrun clutch controlled by the direction of rotation of the pump drive shaft.

10. The brake device as recited in claim 1, wherein the at least one first hydraulic brake circuit and the at least one second hydraulic brake circuit each includes a hydraulic pump kinematically connected to a shared pump drive, and wherein the hydraulic pump assigned to the at least one first hydraulic brake circuit is configured to be selectively connected to a pressure output on the intake side by a valve.

11. The brake device as recited in claim 1, wherein the hydraulic isolation valve completely decouples the at least one second hydraulic brake circuit from the brake-pressure generation device.

12. A method for controlling a brake device for a motor vehicle, comprising:
   providing at least one first hydraulic brake circuit of a first brake circuit group;
   providing at least one second hydraulic brake circuit of a second brake circuit group;
   providing a brake-pressure generation device, wherein the at least one first hydraulic brake circuit is connected to the brake-pressure generation device by a controllable hydraulic valve;
   providing a hydraulic isolation valve configured to selectively and hydraulically decouple the at least one second hydraulic brake circuit from the brake-pressure generation device;
   providing a pressure accumulator connected to the pressure side of the at least one second hydraulic brake circuit by a controllable compensation valve;
   wherein a wheel braked by the at least one second hydraulic brake circuit of the second brake circuit group is connected to an active power component exerting a decelerating effect.

13. The method as recited in claim 12, wherein the hydraulic isolation valve completely decouples the at least one second hydraulic brake circuit from the brake-pressure generation device.

14. The method as recited in claim 12, further comprising:
   opening a switchable charge valve and the controllable compensation valve;
   closing brake-pressure generation valves; and
   operating a hydraulic pump of the at least one second hydraulic brake circuit in order to charge the pressure accumulator;
   wherein a reservoir of the brake-pressure generation device is connected to the intake side of the hydraulic pump of the at least one second hydraulic brake circuit of the second brake circuit group by the switchable charge valve, and the pressure accumulator is connected to an individual brake-pressure generation valve of each wheel brake of a vehicle axle.

15. A method for controlling a brake device for a motor vehicle, comprising:
   providing at least one first hydraulic brake circuit of a first brake circuit group;
   providing at least one second hydraulic brake circuit of a second brake circuit group;
   providing a brake-pressure generation device, wherein the at least one first hydraulic brake circuit is connected to the brake-pressure generation device by a controllable hydraulic valve;
   providing a hydraulic isolation valve configured to selectively and hydraulically decouple the at least one second hydraulic brake circuit from the brake-pressure generation device;
   providing a pressure accumulator connected to the pressure side of the at least one second hydraulic brake circuit by a controllable compensation valve;
   wherein for partial braking, the controllable compensation valve is opened partially to control the pressure in the at least one second hydraulic brake circuit of the second brake circuit group.

16. A method for controlling a brake device for a motor vehicle, comprising:
- providing at least one first hydraulic brake circuit of a first brake circuit group;
- providing at least one second hydraulic brake circuit of a second brake circuit group;
- providing a brake-pressure generation device, wherein the at least one first hydraulic brake circuit is connected to the brake-pressure generation device by a controllable hydraulic valve;
- providing a hydraulic isolation valve configured to selectively and hydraulically decouple the at least one second hydraulic brake circuit from the brake-pressure generation device;
- providing a pressure accumulator connected to the pressure side of the at least one second hydraulic brake circuit by a controllable compensation valve;
- monitoring the pressure accumulator; and
- for a full braking operation when the pressure accumulator is insufficiently charged, opening the isolation valve and supplying hydraulic fluid by the brake-pressure generation device into the at least one second hydraulic brake circuit of the second brake circuit group.

17. A method for controlling a brake device for a motor vehicle, comprising:
- providing at least one first hydraulic brake circuit of a first brake circuit group;
- providing at least one second hydraulic brake circuit of a second brake circuit group;
- providing a brake-pressure generation device, wherein the at least one first hydraulic brake circuit is connected to the brake-pressure generation device by a controllable hydraulic valve;
- providing a hydraulic isolation valve configured to selectively and hydraulically decouple the at least one second hydraulic brake circuit from the brake-pressure generation device;
- providing a pressure accumulator connected to the pressure side of the at least one second hydraulic brake circuit by a controllable compensation valve, wherein a wheel braked by the at least one second hydraulic brake circuit of second brake circuit group is connected to an active power component which exerts a decelerating effect;
- providing a control device to ascertain the brake deceleration to be achieved by the at least one second hydraulic brake circuit of the second brake circuit group by taking into account: a braking request, a decelerating effect achieved by the at least one brake circuit of the first group and the known decelerating torque of the active power component; and
- setting the brake deceleration to be achieved using the compensation valve.

* * * * *